United States Patent
Blecha et al.

(10) Patent No.: US 11,441,548 B2
(45) Date of Patent: Sep. 13, 2022

(54) SHAPE MEMORY BASED ACTUATOR

(71) Applicant: ALMATECH SA, Lausanne (CH)

(72) Inventors: Luc Blecha, Lausanne (CH); Gabriel Paciotti, Bex (CH)

(73) Assignee: ALMATECH SA, Lausanne (CH)

( * ) Notice: Subject to any disclaimer, the term of this patent is extended or adjusted under 35 U.S.C. 154(b) by 316 days.

(21) Appl. No.: 16/635,181

(22) PCT Filed: Aug. 29, 2018

(86) PCT No.: PCT/IB2018/056595
§ 371 (c)(1),
(2) Date: Jan. 30, 2020

(87) PCT Pub. No.: WO2019/043599
PCT Pub. Date: Mar. 7, 2019

(65) Prior Publication Data
US 2021/0095646 A1 Apr. 1, 2021

(30) Foreign Application Priority Data
Aug. 31, 2017 (EP) ..................... 17188787

(51) Int. Cl.
*F03G 7/06* (2006.01)

(52) U.S. Cl.
CPC .......... *F03G 7/065* (2013.01); *F05B 2250/25* (2013.01); *F05B 2260/231* (2013.01);
(Continued)

(58) Field of Classification Search
CPC ................. F03G 7/065; F05B 2250/25; F05B 2260/231; F05B 2280/10304;
(Continued)

(56) References Cited

U.S. PATENT DOCUMENTS 4,559,512 A * 12/1985 Yaeger ............... H01H 61/0107
60/527
4,753,465 A 6/1988 Dalby
(Continued)

FOREIGN PATENT DOCUMENTS

JP S5910789 A 1/1984

OTHER PUBLICATIONS

International Search Report, dated Apr. 12, 2018, from corresponding PCT application No. PCT/IB2018/056595.

*Primary Examiner* — Shafiq Mian
(74) *Attorney, Agent, or Firm* — Nixon & Vanderhye

(57) ABSTRACT

An actuator includes a strand of shape memory material having a length that is variable between a first length corresponding to an undeformed state and a second length corresponding to a state of lengthwise deformation. The strand is arranged to return to the undeformed state when it is heated to a predetermined temperature. The strand includes a fixed end and a mobile end arranged to move between a first and a second position when the variable length of the SMM strand changes. The actuator further includes a heating wire coiled around the strand for heating the strand, the coiled heating wire forming a circular helix, the uniform slope of which is selected so as to avoid any substantial change of the arc length of the circular helix caused by the strand changing its length.

20 Claims, 6 Drawing Sheets

(52) U.S. Cl.
CPC ............... *F05B 2280/1073* (2013.01); *F05B 2280/10304* (2013.01); *F05B 2280/10723* (2013.01); *F05B 2280/5006* (2013.01)

(58) Field of Classification Search
CPC .... F05B 2280/10723; F05B 2280/1073; F05B 2280/5006
USPC .................................................. 60/526–528
See application file for complete search history.

(56) References Cited

U.S. PATENT DOCUMENTS

| | | | | |
|---|---|---|---|---|
| 4,790,624 | A | * | 12/1988 | Van Hoye ............... F03G 7/065 600/151 |
| 5,127,228 | A | * | 7/1992 | Swenson ................. F03G 7/065 60/527 |
| 5,312,152 | A | | 5/1994 | Woebkenberg, Jr. et al. |
| 5,821,664 | A | * | 10/1998 | Shahinpoor ............. F03G 7/065 310/307 |
| 6,499,952 | B1 | | 12/2002 | Jacot et al. |
| 9,462,928 | B2 | * | 10/2016 | Marone ............... A47L 15/4409 |
| 9,810,340 | B2 | * | 11/2017 | Kraus ....................... F02K 9/58 |
| 2015/0096293 | A1 | | 4/2015 | Shome et al. |
| 2016/0369784 | A1 | * | 12/2016 | Brown ................... F03G 7/065 |

* cited by examiner

Fig. 4A
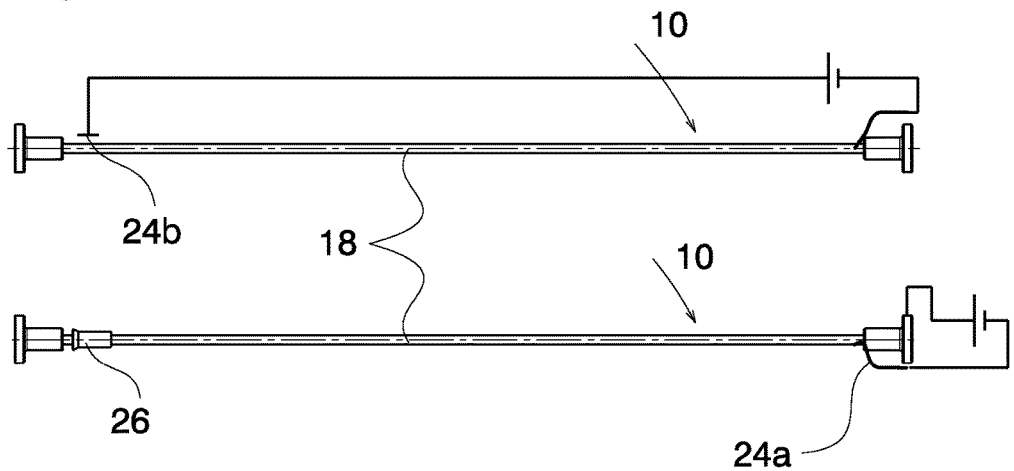
Fig. 4B
Fig. 5A
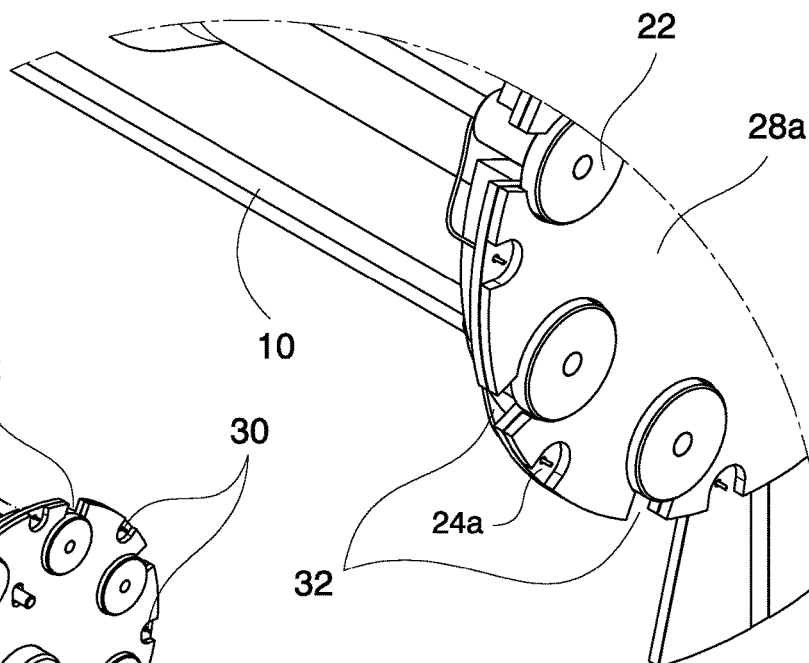
Fig. 5B
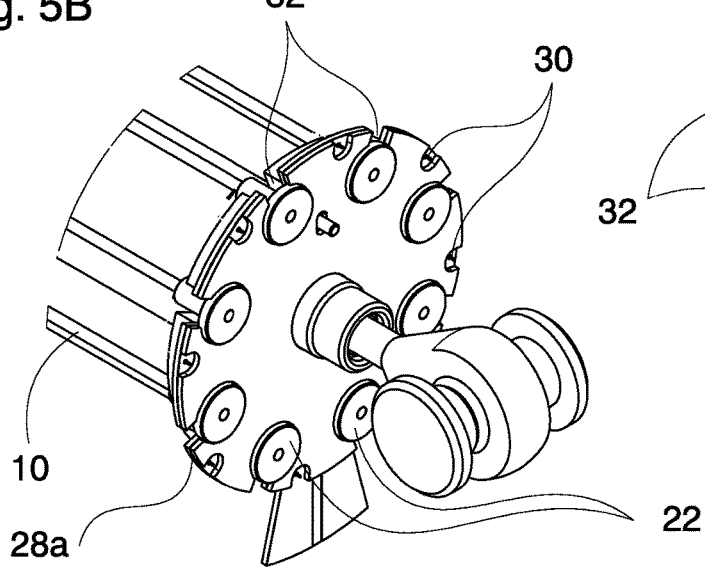

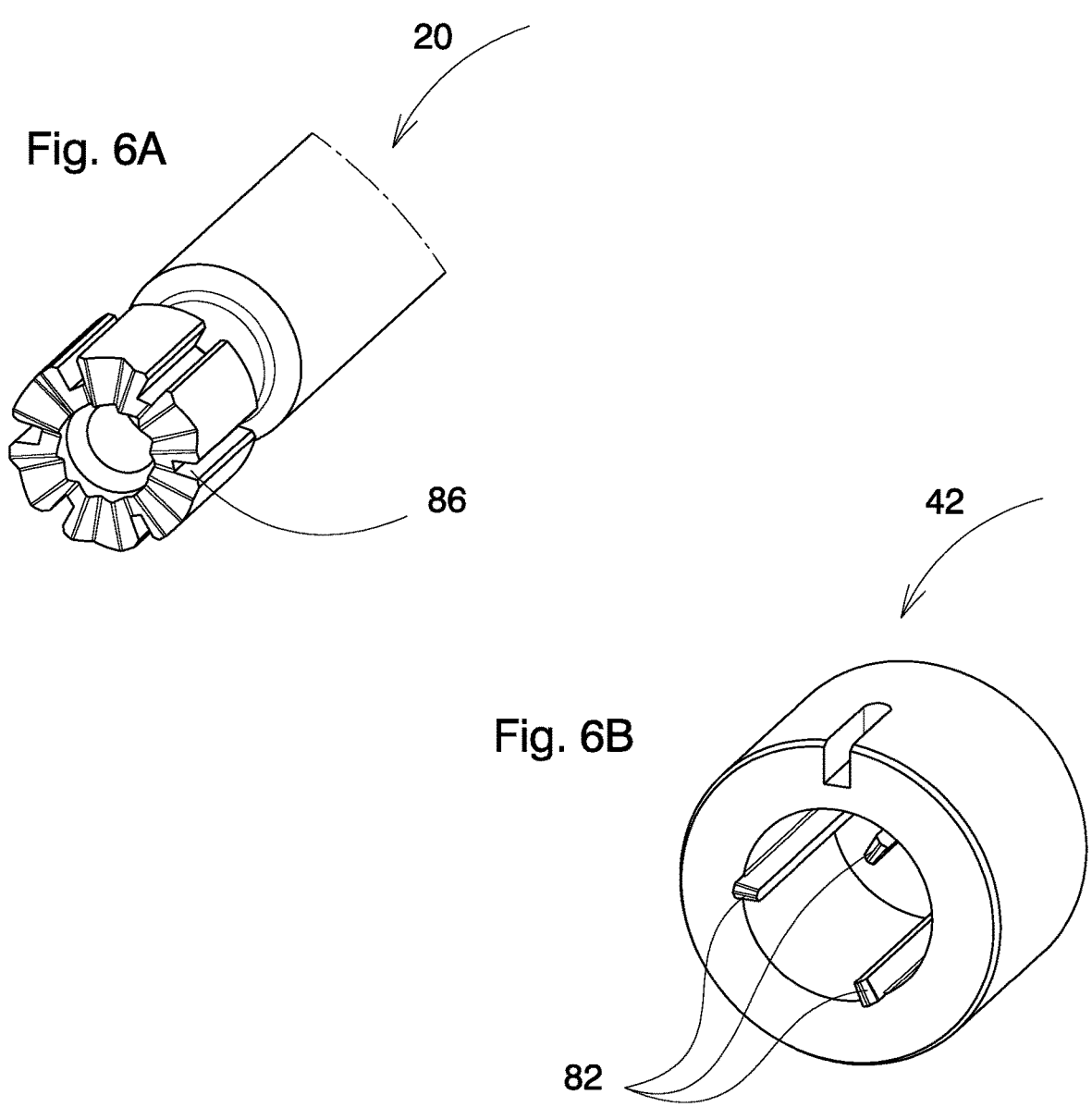

SHAPE MEMORY BASED ACTUATOR

FIELD OF THE INVENTION

The present invention relates generally to an actuator comprising a strand made of shape memory material (SMM) and having a length that is variable between a first length corresponding to an undeformed state of the SMM strand and a second length corresponding to a state involving a predetermined lengthwise deformation from the undeformed state, wherein the SMM strand is arranged to return to the undeformed state from the state involving a predetermined lengthwise deformation when it is heated to a predetermined temperature, the SMM strand comprising a fixed end attached to a fixed mechanical interface of a support structure, and a moving end attached to a mobile interface movable between first and second positions in such a way that the mobile interface may move from one to the other of the first and second positions when the variable length of the SMM strand changes from one to the other of the first and second lengths, and the actuator further comprising electrical means including at least one heating wire coiled around the strand for heating the strand.

BACKGROUND OF THE INVENTION

Actuators are needed for a wide variety of applications. Spacecraft designers in particular are looking for single or multiple use actuators that are highly reliable, light-weight and efficient.

Shape memory materials (SMM) in general, and shape memory alloys (SMA) in particular, are materials that can be pseudo-plastically deformed at relatively low temperature, and will return to their original shape upon exposure to some higher temperature. Although a relatively wide variety of materials are known to exhibit the shape memory effect, only those that can recover substantial amounts of strain or that generate significant force upon changing shape are commonly used in actuators.

The development of new SMA devices, actuators in particular, is being actively pursued. Unlike what is the case with bi-metallic actuators or devices which operate based on material CTE (Coefficient of Thermal Expansion), with SMA actuators recovery from one state to another occurs over a narrow temperature range (approximately 10 C). This is analogous to water boiling when it gets to 100 C (i.e. there is a "state change" which occurs relatively abruptly when the material hits a critical temperature). Furthermore, using SMA technologies can be an effective way of reducing the complexity of a system when compared to the same system using standard technology. Indeed, an advantage of SMAs is that the same component can play both a structural and an active role in the system. Additionally, some known SMA actuators can be activated multiple times, in slow motion (thus avoiding shocks), and are highly reliable.

The most commonly used SMAs are nickel-titanium (Ni—Ti) alloys, also known as "Nitinol" alloys. One notable feature of Nitinol alloys is their relatively low transition temperature (typically about 70° C.). Another notable feature is that Nitinol is electrically resistive with a resistivity somewhere between 70 and 100 μΩ·cm. An advantage of the comparatively high resistivity is that it makes it possible to raise the temperature of a piece of Nitinol by simply passing an electric current through it. Indeed, the electrical resistance of an object is directly proportional to the resistivity of the material it is made of, and inversely proportional to the cross-section of the object. One will therefore understand that, in the case of a wire-shaped piece of Ni—Ti, the electrical resistance can be quite large; even large enough for a moderately intense electric current to cause the temperature of the Nitinol wire to rise above its shape memory transition temperature. In contrast, when the piece of Nitinol is not wire shaped, or even when it is wire-shaped but has a large cross-section, the intensity of the electric current necessary to raise the temperature of the Nitinol piece above its transition temperature often exceeds the capacity of a spacecraft's on-board electrical infrastructure. In these circumstances, other heating methods are needed.

Alternative heating methods are known. For example, patent document U.S. Pat. No. 5,312,152 discloses an actuator built around an Ni—Ti SMA tube with an undeformed (memory) length of 154.9 mm. If the tubular element is first pseudo-plastically elongated about 10 mm, it can then shrink back to its memory length upon being heated to its transition temperature. The SMA tube has an outside diameter of 8.13 mm and an inside diameter of 7.11 mm. Its effective cross-section is therefore approximately 12.2 mm$^2$. In such a case, heating up the SMA element to above its transition temperature, by passing electric current through it, can be overly demanding in terms of the minimal intensity required for the electric current.

In order to raise the temperature of the SMA tube, the above-mentioned patent document teaches to arrange two flexible thermofoil electrical resistance heaters against the cylindrical outside wall of the tube. The prior art document further teaches to hold the two heaters in place using an overwrap of thermally shrinkable tape. FIG. 1 of said prior art document shows an actuator with its SMA tube in the deformed (i.e. elongated) state. Judging from the drawing, the sleeve formed by the two assembled thermofoil heaters is long enough to cover between 75 and 80% of the cylindrical central portion of the SMA tube. When the tube is heated up to its transition temperature, it recovers its shape prior to stretching. In the process, the length of the tube is reduced by approximately 6.5%. As there is no adhesive between the thermofoil and the surface of the tube, portions of the tube can slide longitudinally inside the thermofoil sleeve, thus accommodating the change of length.

One will understand that such an arrangement is only possible provided the sleeve of thermofoil is not bound to tightly around the cylinder. One problem with this prior art construction is that, as the sleeve of thermofoil must fit slackly around the SMA tube, direct thermal contact between the thermofoil heaters and the SMA is limited. Limited thermal contact implies limited conductive heat transfer and therefore slower heating of the SMA tube. One way of avoiding this problem is to use elastically deformable thermofoil heaters. The foil being elastic, it is in principle capable of matching any change of shape of the SMA. The sleeve of thermofoil can thus be arranged to fit tightly around, and even to adhere to, the SMA tube. One drawback with this solution is the relatively limited life cycle of elastically deformable thermofoil in real operating conditions.

As previously mentioned, the transition temperature of Nitinol alloys is often as low as about 70° C. On the one hand, this feature makes it rather easy to heat an SMA component of an actuator to above its transition temperature. On the other hand, in the particular operating conditions on-board a spacecraft, the low transition temperature can make it difficult to keep the temperature of an SMA component below its transition temperature, and can make it difficult as well to cool down the SMA component after heating. Indeed, convective cooling does not take place in vacuum. Furthermore, active cooling is usually not a practical alternative due to the limited electrical power available.

Apart from the nickel-titanium (Ni—Ti) alloys that have just been discussed, the SMAs most often considered for space applications are copper-base alloys, in particular Cu—Al-base alloys like Cu—Al—Ni for example. The transition temperature of these copper-base alloys can range from ambient temperature to 200° C. in cycling, and even up to 250° C. in one-shot mode. Contrarily to Ni—Ti alloys, Cu—Al—X alloys are good electrical conductors, (for example, the resistivity of Cu—Al—Ni is reported to be somewhere between 11 and 13 µΩ·cm). One consequence of the low resistivity is that simply passing a moderately intense electric current through a piece of Cu—Al—Ni alloy will usually not do the job of raising the temperature above the transition temperature, even in the case of a relatively small wire-shaped piece of Cu—Al—Ni alloy. On the other hand, an advantage of using Cu—Al—Ni alloys as SMAs instead of the more usual Ni—Ti alloys is that it makes it much easier to maintain the temperature of an SMA below its transition temperature.

SUMMARY OF THE INVENTION

It is therefore an object of the present invention to solve the above-mentioned problems of prior art actuators by providing an SMA based actuator with heating means that are efficient and enjoy an increased operational life. The present invention achieves this object and others by providing a Shape Memory based actuator according to the annexed claim 1.

According to the invention, the heating wire that is coiled around the strand forms a circular helix. One definition of a circular helix is a curve that can be traced on a cylinder by the rotation of a point crossing right sections of the cylinder at a constant oblique angle (https://www.merriam-webster.com/dictionary). One will therefore understand that, according to the invention, the coiled heating wire follows a curve that can be superposed on the curve traced on a cylinder by the rotation of a point crossing its right sections at a constant oblique angle. Said constant oblique angle is also the angle measured between a tangent line at any point of the circular helix and a plane that is perpendicular to the axis of the helix. Helices in general have the property that the oblique angle is constant or, in other words, is the same at any point of a particular helix (i.e. the oblique angle is uniform).

In mathematics, a circular helix is a curve in 3-dimensional space. The following parametrization in Cartesian coordinates defines a circular helix of radius a and slope b/a:

$$t \to (a \cos t, a \sin t, bt)$$

One will understand that the parametrization travels along a complete helix turn when the parameter t goes from t=0 to t=2π. Furthermore, the height of one complete helix turn (i.e. the "pitch" of the helix) is equal to 2πb and the "arc length" of the same complete turn is equal to $2\pi \cdot \sqrt{a^2+b^2}$. Finally, if we denote α the oblique angle of the helix, the slope b/a is equal to tan α and α=tan$^{-1}$(b/a).

According to annexed claim 1, the "first length" corresponds to a contracted state of the SMM strand and the "second length" corresponds to an extended state of the strand. It should therefore be understood that the first length is smaller than the second length. Indeed, extension and contraction are types of linear strain, and the two expressions "contracted" and "extended" in the claims should both be understood as referring to lengthwise (or axial) contraction and extension.

The inventors observed a number of particularities of SMM actuators when compared to actuators which operate based on material CTE (Coefficient of Thermal Expansion). Specifically, one of these particularities, which is generally overlooked, is that the axial strain associated with the state change of shape memory materials is almost always much larger than the associated volume change ratio. A consequence of this particularity is that a strand made of SMM usually exhibits transverse and axial strain of opposite types during state change. In other words, when the strand of SMM deforms in such a way as to become shorter, it also becomes wider, and conversely, when the strand becomes longer, it also becomes thinner.

When a heating wire is coiled around a strand of SMM in such a way as to form a circular helix, the coexistence of transverse and axial strain of opposite types can have useful implications. Indeed, when for example, the strand extends from its first length to its second length, on the one hand, it becomes thinner and the resulting decrease of the strand's girth (or circumference) contributes to loosening the turns of the heating wire. On the other hand, the strand simultaneously becomes longer and the resulting increase of the pitch (or height) of the helix contributes to tightening the turns of the heating wire. In view of the above, the inventors managed to verify that, if the uniform slope of the helix is chosen properly, the effects of the axial and of the transverse strain on the arc length of the helix may cancel out, avoiding any significant exposure of the heating wire to strain and thus to stress.

According to the invention, the uniform oblique angle is selected so as to avoid any substantial change of the arc length of the circular helix caused by the SMM strand extending from the first length to the second length or contracting from the second length to the first length. An advantage brought by this feature is that the heating wire does not suffer significant stress whatever the change in length of the strand of Shape Memory Material (SMM). This absence of any significant stress considerably increases the lifetime of the heating system.

According to a preferred embodiment of the invention, the magnitude of the uniform slope of the circular helix is comprised between 0.62 and 0.76 when the variable length of the SMM strand is equal to the first length.

BRIEF DESCRIPTION OF THE DRAWINGS

Other features and advantages of the present invention will appear upon reading the following description, given solely by way of non-limiting example, and made with reference to the annexed drawings, in which:

FIGS. 4A and 4B are schematic illustrations showing how the heating wire may be connected to a power supply according to a second particular embodiment of the invention;

FIG. 5A is a partial view in perspective showing the mechanical and electrical interface between the fixed ends of a plurality of SMA rods and a support structure according to a third particular embodiment of the invention;

FIG. 5B is perspective view showing the mechanical and electrical interface of FIG. 5A with the top layer of thermal and electrical insulator removed in order to show the printed circuit;

FIG. 6A is perspective view of the front end of the pusher tube of the bistable mechanism of an SMM actuator according to a fourth particular embodiment of the invention;

FIG. 6B is perspective view of the frame cap of the bistable mechanism of an SMM actuator according to the fourth particular embodiment;

FIG. 6C is perspective view of the rotor of the bistable mechanism of an SMM actuator according to the fourth particular embodiment;

DETAILED DESCRIPTION OF AN EXEMPLARY EMBODIMENT

Figure 1A:
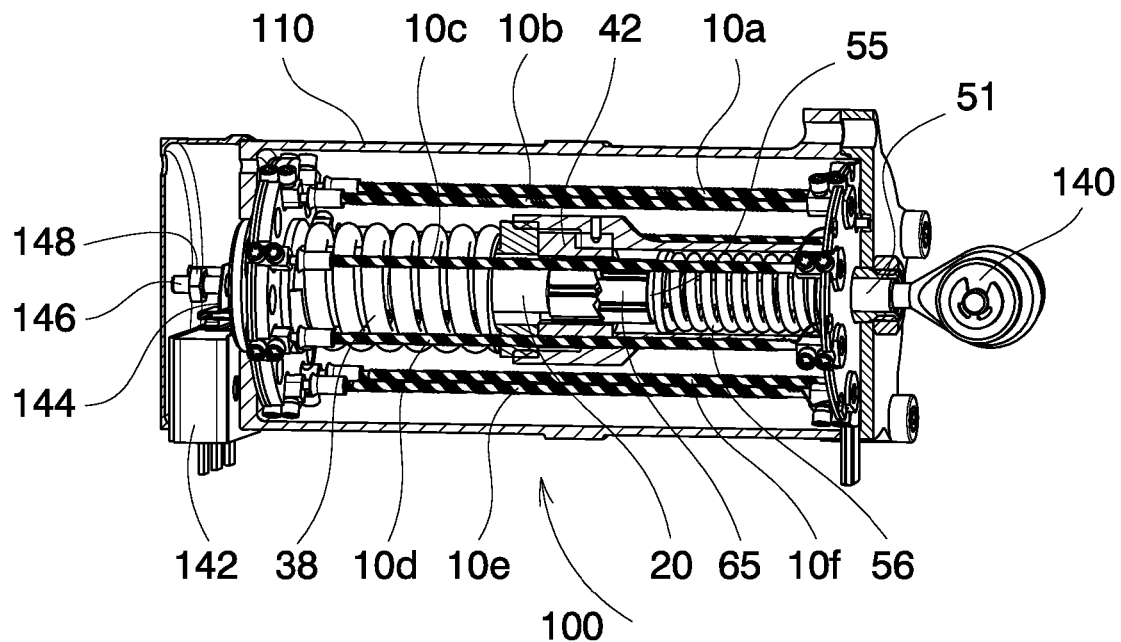
FIG. 1A is a perspective view from the side of the interior of an SMM actuator according to a first particular embodiment of the invention.
Figure 1B:
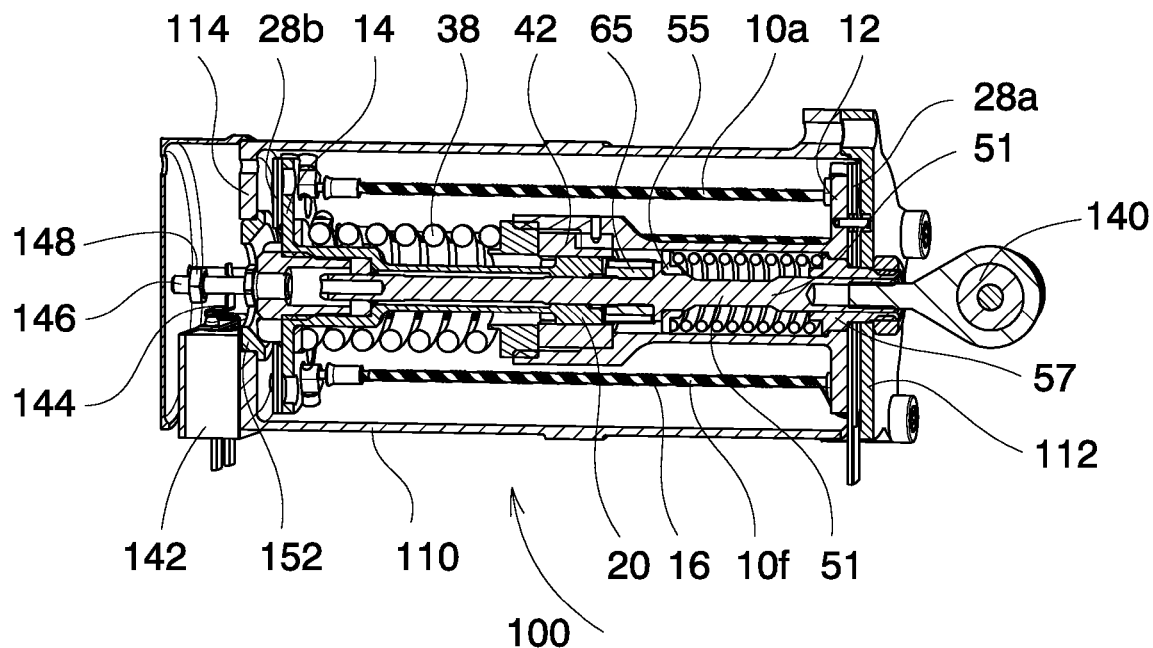
FIG. 1B shows the SMM actuator of FIG. 1A in longitudinal cross-section.

FIGS. 1A and 1B are illustrations of an actuator according to an exemplary embodiment of the invention. According to the invention, the actuator comprises at least one strand of Shape Memory Material (SMM) having a predetermined deformation from an undeformed state, and returning to the underformed state when heated to a predetermined temperature. In the illustrated example, the actuator (generally referenced 100) actually comprises eight strands of SMM, and each strand consists in a 1 mm diameter cylindrical rod made out of a single crystal of Cu—Al—Ni shape memory alloy (SMA). In the present description, the SMA rods are generally referenced 10, and individual rods are distinguished between by using an appended letter. Accordingly, the six individual rods visible in FIG. 1A are referenced 10a, 10b, 10c, 10d, 10e and 10f respectively. The eight SMA rods of the actuator are arranged in parallel and they are held in place at either end by two ring-shaped mechanical interfaces (referenced 12 and 14 respectively). The ends of the rods are attached to the two ring-shaped interfaces in such a way as to define two pitch circles, along which the ends of the rods are regularly spaced.

A first 12 of the two mechanical interfaces is fixed to a support frame of the actuator. Accordingly, the ends of the rods 10 that are attached to the first mechanical interface 12 are referred to as the fixed ends of the rods. At the opposite end, the second mechanical interface 14 is mobile, and it is part of a mechanism arranged to be driven by the SMA rods (said mechanism will be described further on). The ends of the rods that are attached to the mobile mechanical interface 14 are referred to as the moving ends of the rods.

The second mechanical interface 14 carries a cylindrical pusher tube referenced 20. The pusher tube is fixed rigidly to the mobile interface 14 and extends towards the fixed mechanical interface 12, in parallel with the SMA rods 10. The longitudinal axis of the pusher tube 20 is aligned with the centers of the two pitch circles. The Shape Memory Alloy rods 10 are arranged to actuate the pusher tube 20 when they regain their undeformed state. In the present example, the rods are shorter in their undeformed state than in their deformed state. The thermal shape transition of the SMA causes the pusher tube 20 to move axially towards the front end of the actuator housing 110 (the front end is on the right side in FIGS. 1A and 1B). Once the SMA rods have been used a first time to actuate the pusher tube 20, they have to be submitted to strain in order that they regain their predetermined deformation before they can be used a second time. This operation is called the "Reset". The stress needed for reset is provided by a reset spring 38. Referring more particularly to FIG. 1B, one can observe that the reset spring is a helical spring that encircles the pusher tube 20 and is held in place at the front end by a fixed annular abutment provided by a hub-shaped frame cap 42, and bears against the mechanical interface 14 at its rear end. The frame cap 42 comprises an axial opening through which the pusher tube 20 may pass.

Figure 2:
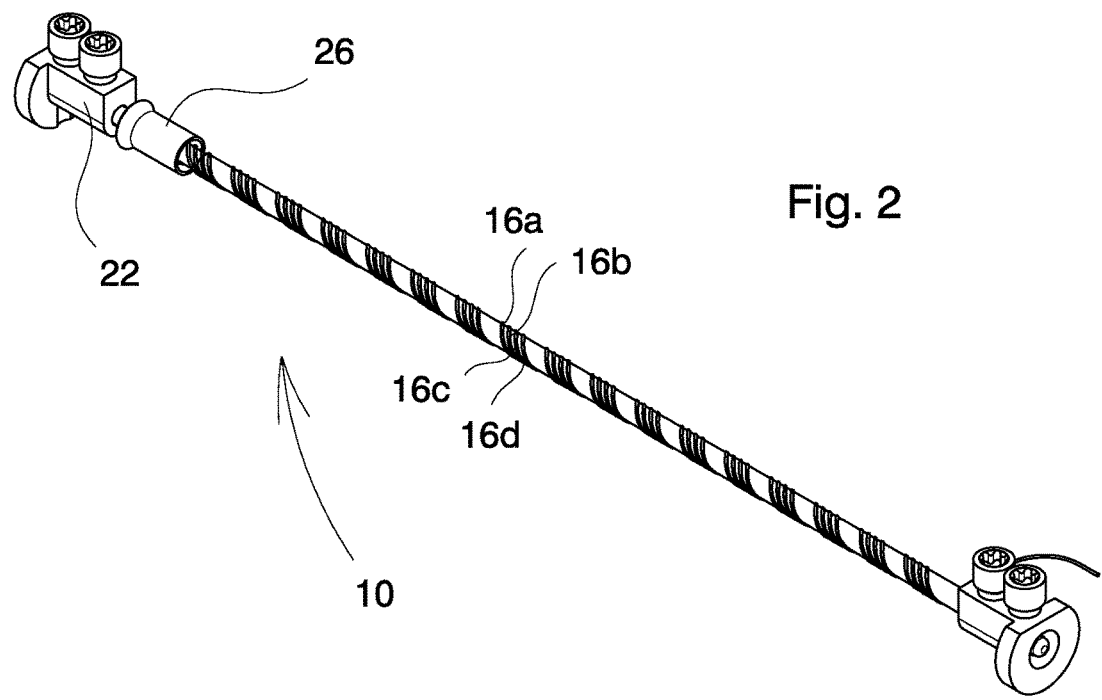
FIG. 2 is a perspective view showing a SMA rod and four heating wires connected in parallel and coiled around the rod in such a way as to form a quadruple helix.

According to the invention, the actuator 100 further comprises electrical means, for heating said at least one strand. The electrical means comprise at least one heating wire that is coiled around the strand in such a way as to from a circular helix. In the illustrated example, four heating wires 16a, 16b, 16c, 16d (FIG. 2) are coiled around each one of the SMA rods 10. FIG. 2 is a perspective view showing one of the SMA rods (referenced 10) of the actuator 100. According to the illustrated embodiment, the four heating wires are connected in parallel and are arranged so as to form a set of congruent circular helices having the same axis. The use of four heating wires connected in parallel instead of using a single heating wire is intended to increase the redundancy of the heating means. Indeed, if only a single heating wire was coiled around each SMA rod 10, the breakage of the heating wire would result in the SMA rod being out of service. In contrast, the illustrated actuator 100 can survive the breakage of several heating wires. In the present example, the heating wires 16a, 16b, 16c, 16d, coiled around the SMA rods are made of high resistance NiCr.

As the Cu—Al—Ni alloy of the rods 10 has high conductivity, it is necessary to provide electrical insulation between the heating wires 16a, 16b, 16c, 16d and the SMA rod. Accordingly, in the present example, the heating wires are insulated from each other, as well as from the SMA rod, by means of thin polyimide films. The polyimide films also serve to merge the four heating wires into a heating ribbon 16. According to a preferred embodiment, a thermally conductive and electrically insulating elastomer is further used to improve thermal and mechanical contact between the heating ribbons and the SMA rods (the elastomer is shown in FIGS. 4A and 4B wherein it is referenced 18). Referring again to FIG. 2, one can observe that the illustrated SMA rod 10 is fitted with end-pieces 22 provided for attaching each end of the rod to one of the two mechanical interfaces 12, 14. As shown, the end-pieces 22 can be in the shape of small hubs with a wide head and a smaller-diameter cylindrical projection into which one end of a SMA rod is inserted.

Figure 3A:
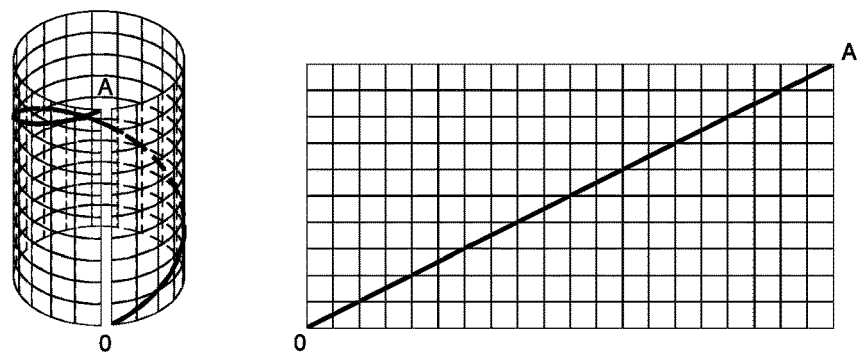
FIGS. 3A and 3B are two diagrams illustrating how the conjugated effects of axial strain of one type and of transverse strain of the opposite type may result in the arc length of the helix remaining constant.
Figure 3B:
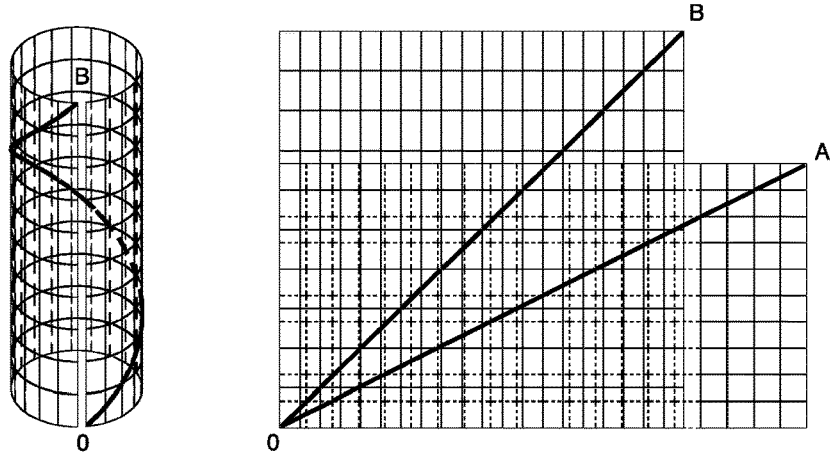

FIGS. 3A and 3B are two pairs of schematic diagrams showing one turn of the circular helix formed by the heating wire coiled around the SMM strand of the actuator according to the invention, wherein the second schematic diagram in each pair depicts the helix unwrapped onto a tangent plane. As can be observed, unwrapping one turn of a circular helix onto a tangent plane of the helix yields a straight line (constant or uniform angle).

According to the invention, the length of the SMM strand around which the heating wire is coiled is variable between a first length corresponding to a contracted state and a second length corresponding to an extended state. One will further understand that any lengthwise extension of the SMM strand will cause the pitch of the helix to increase, while any lengthwise contraction will cause the pitch of the helix to decrease. FIG. 3A shows one turn of the circular helix when the SMM strand is in its contracted state and FIG. 3B shows the same turn of the circular helix when the SMM strand is in its extended state.

As previously mentioned, the circular helix formed by the coiled heating wire can be described mathematically by the following parametrization in Cartesian coordinates:

$$t \to (a \cos t, a \sin t, bt)$$

where a is the radius of the circular helix and b/a is its uniform slope.

The height of one complete helix turn (i.e. the "pitch" of the helix) is equal to $2\pi b$ and the "arc length" of the same complete turn is equal to $2\pi\sqrt{a^2+b^2}$.

The inventors were inspired to try to find a uniform oblique angle for a helix, or equivalently a uniform slope for a helix, such that the transverse and axial strains cancel out in such a way that the arc length of the helix after deformation of the strand of SMM is equal to the arc length of the helix before the deformation. The following expression gives the value of the equilibrium slope for which there is no change of the arc length as a function both of the elongation of the SMM strand and of its volume change:

$$b/a = \sqrt[2]{\frac{\epsilon + 1 - \delta}{\epsilon(\epsilon + 1)(\epsilon + 2)}}$$

Where $\epsilon$ is the elongation strain of the SMM strand and $\delta$ is the volume change ratio ($\delta = V_{final}/V_{initial}$).

The derivation of the mathematical expression for the equilibrium slope is given in the Annex. Furthermore, it should be noted that the above defined equilibrium slope exists only if $\delta < \epsilon + 1$, or in other words, if the volume change ratio is smaller than the corresponding axial contraction or extension ratio.

Referring once more to FIGS. 3A and 3B, one will note that the radius of the helix shown in FIG. 3A is substantially larger than the radius of the helix shown in FIG. 3B. In other words, the SMM, from which the strand is made, is an SMM that exhibits transverse and axial strain of opposite types. Now referring simultaneously to FIGS. 3A and 3B, one can grasp intuitively how the conjugated effects of axial strain of one type and of transverse strain of the opposite type may result in the arc length of the helix remaining constant.

According to the invention, the SMM, from which the strand is made, is an SMM that exhibits transverse and axial strain of opposite types during state change, or in other words, the volume change ratio is smaller than the corresponding axial contraction or extension ratio ($\delta < \epsilon + 1$). This limitation is not problematic as the magnitude of the volumetric strain in SMMs is usually considerably less than the magnitude of the axial strain. For example, in the case of Nitinol the volumetric transformation strain is reported to be approximately 0.16%, while the axial transformation strain can be as much as 8.5%. One should keep in mind however that "shape memory" refers to the property of SMMs to return to their undeformed shape when heated to a predetermined temperature. As the shape transition of SMM is a thermal transition, and the return of the SMM to its undeformed state is accompanied by a rise in temperature. Ordinary thermal expansion will also take place and influence the actual amount of volume change.

According to the presently described embodiment of the invention, wherein the SMM consists in a Cu—Al based SMA (Cu—Al—Ni in particular). In this particular case, the volumetric transformation strain can be neglected, and the following expression gives the value of the equilibrium slope:

$$b/a = \sqrt[2]{\frac{1}{(\epsilon+1)(\epsilon+2)}}$$

One will understand in particular that the above expression also applies to the case where the SMM strand is made of Ni—Ti.

Exactly how much strain is acceptable for the heating wire depends on the material out of which the heating wire is made, and in particular on the heat expansion coefficient of the material. The applicant has observed that 0.2% strain is acceptable in the case of a Ni—Cr heating wire. Accordingly, in the present example, the magnitude of the uniform slope of the circular helix formed by the heating wire should be comprised between 0.62 and 0.76 when the SMA rod is in its shorter undeformed state.

The heating wires need to be supplied with electric current in order to raise the temperature of the SMA rod to above the transition temperature. FIGS. 4A and 4B show schematically how the heating wires can be connected to an electrical power supply. As previously explained, according to the illustrated embodiment, the heating ribbon 16, comprising the heating wires 16a, 16b, 16c, 16d wrapped in polyimide films, is tightly wound around the SMA rod 10 and optionally attached to the surface of the rod by means of thermally conductive elastomer. At each one of its ends, the heating ribbon comprises a short terminal portion wherein the NiCr wires 16a, 16b, 16c and 16d, are exposed and twisted together so as to form a lead used for connecting the heating ribbon. As shown in FIG. 4A, one of the leads (referenced 24a) is located near the fixed end of the rod 10, while the other lead (referenced 24b) is located near the moving end of the rod.

Connecting the lead 24a located near the fixed end to the power supply can be straightforward. However, connecting the lead 24b located near the moving end could, in principle, require the use of moving electrical wires. One will understand that such floating connections can be detrimental to the operating life of an actuator. In order to avoid this problem the heating system of the present example uses the SMA rod 10 as a return loop arranged to conduct the electric current back to the fixed end. Accordingly, a metal crimp 26 is located near the moving end of the rod and is arranged to provide the electrical connection needed between the lead 24b and the SMA rod 10. On the other side, as shown in FIG. 4B, the fixed end of the SMA rod is connected to one of the terminals of the power supply, while the lead 24a is connected to the other terminal of the power supply. Such an arrangement makes it possible to supply electricity to the heating wires through the fixed end of the rod only.

When electric current passes through the heating wires, the heat generated by the current flows into the SMA rod through the thermally conductive polyimide film. As the temperature of the SMA rod begins to rise, a fraction of the heat flowing into the SMA rod is not retained in the rod, but is lost through thermal dissipation. In space, thermal losses can be of only two kinds, radiative and conductive. Thermal losses through radiation should be substantially the same over the entire length of the rod. In contrast, conductive losses should be limited to points of mechanical contact between the SMA rods and the rest of the actuator. Turning once more to FIGS. 1A and 1B, one can observe that the SMA rods are held by their two ends. The mechanical contact at either end is thus the only path, along which conductive heat transfer can take place. With such an arrangement, conductive losses have the potential to significantly lower the temperature of the ends of the SMA rod. Such a thermal gradient will induce a reduction of the net stroke of the rod. According to the present example, in order to enhance the uniformity of temperature along the length of the rod, the ends of the rod are thermally insulated from the rest of the actuator. This result is obtained by arranging at least one layer of thermally insulating material between the rods and the mechanical interface.

FIGS. 5A and 5B show how a double-layered printed circuit board (PCB) 28a (made out of Arlon for example) can be arranged at the fixed end of the SMA rods 10 in order to provide a layer of thermally insulating material for thermally separating an end-piece 22 of each SMA rod from the fixed mechanical interface. The outer edge of the generally disk-shaped PCB 28a comprises eight regularly spaced notches 32 that are adapted to receive the smaller diameter cylindrical projection of one of the end-pieces 22 of a SMA rod 10. In FIG. 5B, the upper layer of the double layered PCB 28a has been removed in order to show the conductor tracks 30 of the PCB. As illustrated, each notch 32 is surrounded by a conductor track 30. When the rods 10 are inserted with their end-pieces 22 into the notches 32 of the PCB, the head of each one of the end-pieces 22 comes into contact with one of the conductor tracks 30. One can further observe that the outline of the conductor tracks 30 is not symmetrical, and that each conductor track extends a considerable distance from one side of a notch along the edge of the disk-shaped PCB. In fact, each conductor track 30 surrounding a particular notch 32 stops just short of joining with the conductor track surrounding the next notch. Each asymmetrical conductor track 30 surrounding a particular one of the notches 32 is arranged for connecting the head of the end piece 22 that is inserted into that particular notch with the lead 24a of the heating ribbon coiled around the next SMA rod. The heating ribbons coiled around the different SMA rods are thus connected in series. This arrangement reduces the amount of electric current needed to heat the SMA rods. An advantage of covering the outside of the fixed mechanical interface 12 with the double-layered printed circuit board 28a is that it provides a three-in-one solution. The PCB serves to thermally insulate the SMA rods from the rest of the actuator, it also serves to connect the heating wires coiled around the different SMA rods to the rest of the heating means, and finally the PCB also serves to position the SMA rods along the pitch circle. It should further be understood that, although it is not shown in detail, a layer of thermally insulating material 28b (also made out of Arlon for example) is preferably arranged at the moving end of the SMA rods for thermally separating the other end-piece 22 of each SMA rod from the mobile mechanical interface 14. The layer of insulating material 28b serves to thermally insulate the SMA rods from the rest of the actuator, and it also serves to position the SMA rods along the pitch circle on the moving side.

Returning again to FIGS. 1A and 1B, one can observe that the actuator 100 comprises a cylindrical housing 110 with a front end 112 and a rear end 114. The front end comprises a central opening through which extends one end of an axial slider shaft 51. The protruding end of the slider shaft 51 carries a mechanical output interface 140. The rear end 114 of the housing also comprises a central opening, and a short threaded shaft 146 extends axially through this opening. The threaded shaft 146 is rigidly attached by one end to the back side of the mobile mechanical interface 14. One will therefore understand that any change in the length of the SMA rods causes a movement of the threaded shaft 146 in the axial direction. Still referring to FIGS. 1A and 1B, one can see an electrical switch box 142 that is mounted on the rear end 114. A switch lever on the switch box 142 is maintained in a lowered position by a resilient strip-spring 144. A hole is formed through the strip-spring near one end, and the bent strip is arranged so that the threaded shaft 146 extends through the hole. The other end of the bent strip-spring is attached to the rear 114 of the housing. An adjustable nut 148 is further threaded onto the shaft 146.

When electric current flows through the heating wires, the temperature of the SMA rods 10 rises to above the transition temperature, causing the SMA to return to its original shape prior to stretching. This process causes the SMA rods to shorten. As the threaded shaft 146 is rigidly connected to the moving ends of the SMA rods, the threaded shaft and the nut 148 are pulled axially in the direction of the interior of the housing 110. When the SMA rods near their original memory shape, the nut 148 comes up against the bent strip-spring 144 and causes it to bend in such a way as to release the switch lever of the switch box 142. Releasing the switch lever interrupts the flow of electric current through the heating wires. In this way, the switch can cut off the electrical power supply when the SMA has completed its change of shape.

The actuator of the present example is also equipped with a mechanical stopper arranged to prevent overstretching of the SMA rods 10 during reset. According to the illustrated example, the mechanical stopper is a hardened stainless steel ring 152 plugged into the central opening in the rear end 114 of the housing. The hardened stainless steel ring and the mobile mechanical interface have shape complementarity. When the SMA rods have been stretched to their predetermined deformed length by the action of the reset spring 38, the mechanical interface abuts against the mechanical stopper, thus protecting the SMA against overstress.

The elements of the actuator 100 that have been described up to now constitute as a whole a monostable SMA actuator, i.e. capable of thrust operating when electrically supplied, but not able to maintain the position reached once the power supply is cut off. The following section describes a bistable mechanism which is arranged to be driven by the pusher tube 20 and to drive the previously mentioned slider shaft 51, the front end of which is fitted with the mechanical output interface 140. The slider shaft has a generally cylindrical shape and it extends along the geometrical main axis of the actuator. One will therefore understand that the slider shaft 51 and the pusher tube 20 are both aligned concentrically with the centers of the pitch circles on the mechanical interfaces 12, 14. Referring in particular to the cross-sectional view of FIG. 1B, on can see that the pusher tube 20 is hollow and that a rear portion of the slider shaft 51 is slidably inserted into the hollow tube.

Still referring to FIG. 1B, on will note that the slider shaft 51 comprises an annular abutment 55 arranged to cooperate with one end of a helical compression spring 56 which encircles a front portion of the slider shaft and bears at its other end against a fixed annular abutment 57 in the form of a hub plugged into the central opening of the front end 112 of the housing of the actuator 100. The fixed annular abutment comprises an axial opening through which the slider shaft 51 may pass with but little play. As will be explained in more details further on, the bistable mechanism is adapted to control the slider shaft in such a way as to displace it axially in either direction between two stable positions. In order to distinguish between the two stable axial positions, we will refer to the one in which the mechanical output interface 140 is furthest away from the housing 110 as the "extended position", and we will refer to the other position as the "retracted position". The displacement of the slider shaft 51 to the extended position is effected against the action of the compression spring 56, and the displacement of the slider shaft back to the retracted position is effected under the action of the pressure of the spring 56.

The bistable mechanism further comprises a rotor 65 (shown in more details in FIG. 6c). The rotor consists in a hollow cylinder that is mounted concentrically onto the slider shaft 51 and is arranged to bear against the rear side of the annular abutment 65. The cylindrical outer face of the rotor 65 is provided with six longitudinally-extending grooves 67 regularly spaced around the axis of the rotor. Furthermore, the rear end face of the rotor 65 is formed with twelve triangular teeth 79, each having a leading flank inclined more steeply than a trailing flank. It should finally be noted that each one of the grooves 67 registers with the lower end of the leading flank of one of the teeth.

The diameter of the rotor 65 is such that the rotor can theoretically pass through the cylindrical opening in the frame cap 42 with but little play. However, the cylindrical opening is provided internally with six radial keys or ribs 82 set at 60° to each other. These keys are such a height that they can stop the rotor 65 from sliding into the cylindrical opening. However, when the keys 82 are in line with the grooves 67 of the rotor, the rotor may slide into the opening, and it will be appreciated that the grooves 67 extend from the lower ends of the leading flanks of alternate teeth 79.

The front end of the pusher tube 20 is the same diameter as the rotor 65. Furthermore, the front end face of the pusher tube 20 is formed with teeth which are the same in number and of the same character as those teeth formed on the rear end face of the rotor, and the cylindrical outer face of an end portion of the pusher tube 20 is provided with six longitudinally-extending grooves 86 of the same character as those grooves 67 formed on the sides of the rotor 65. By cooperating with the keys 82, the longitudinally-extending grooves 86 of the pusher tube 20 allow the latter to slide inside the frame cap 42, but prevent the frame cap from rotating relative to the pusher tube.

Figure 7A:
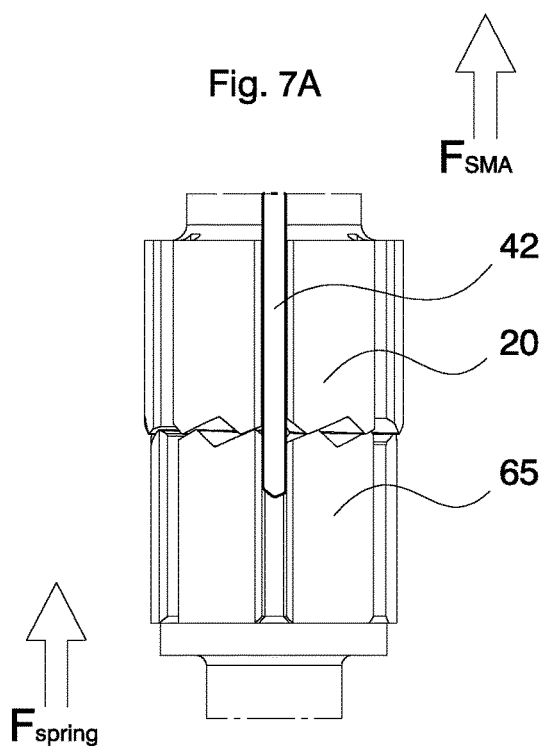
FIGS. 7A to 7H show eight configurations taken successively by a bistable mechanism during its cyclical operation, the bistable mechanism being part of an actuator according to the fourth particular embodiment of the invention.
Figure 7B:
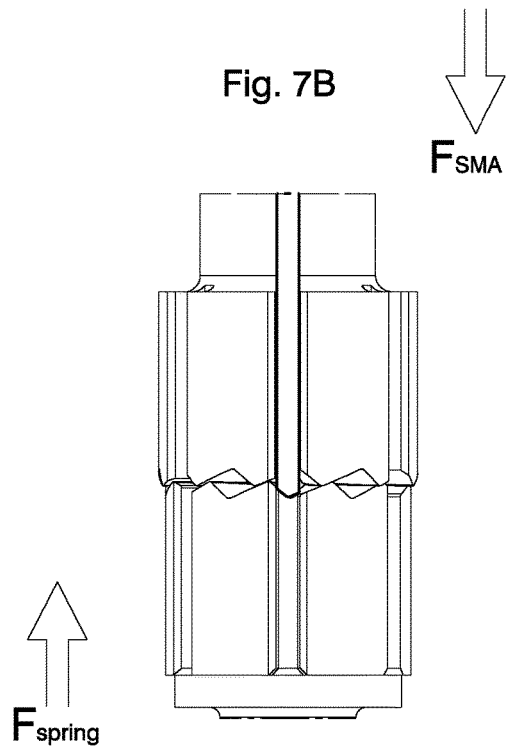
Figure 7C:
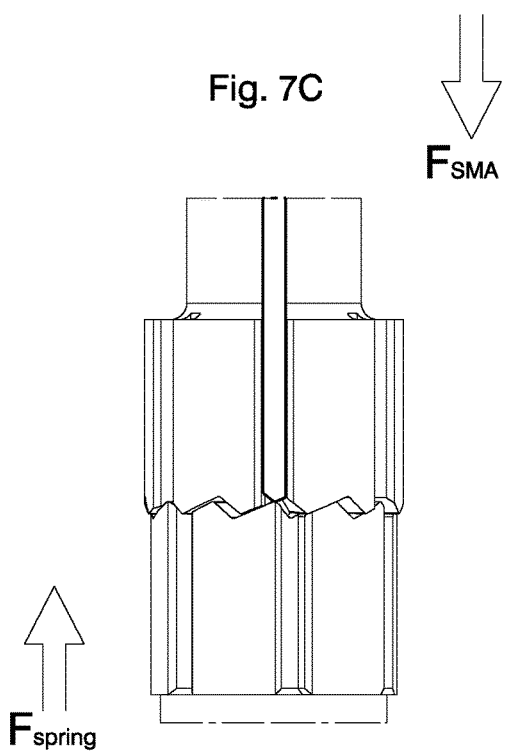
Figure 7D:
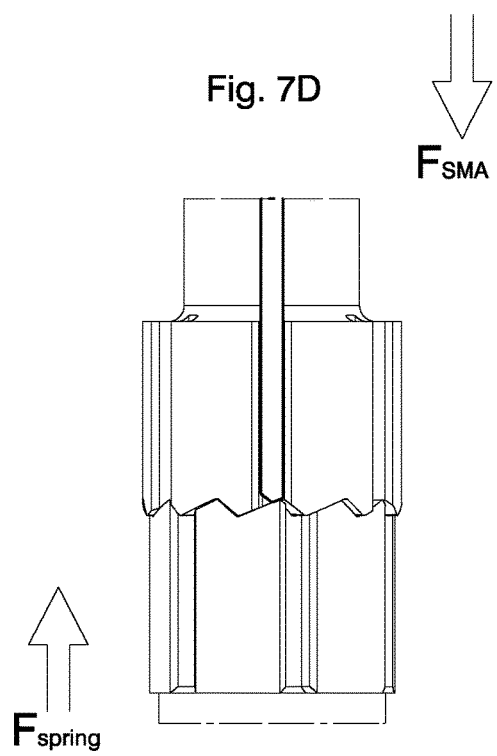
Figure 7E:
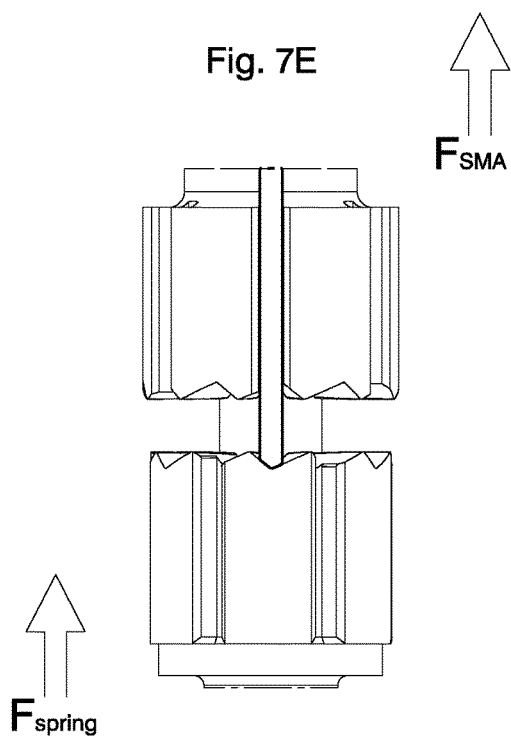
Figure 7F:
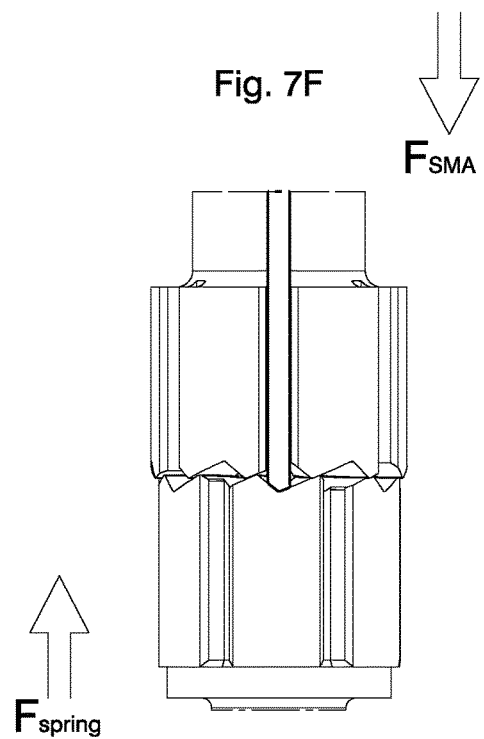
Figure 7G:
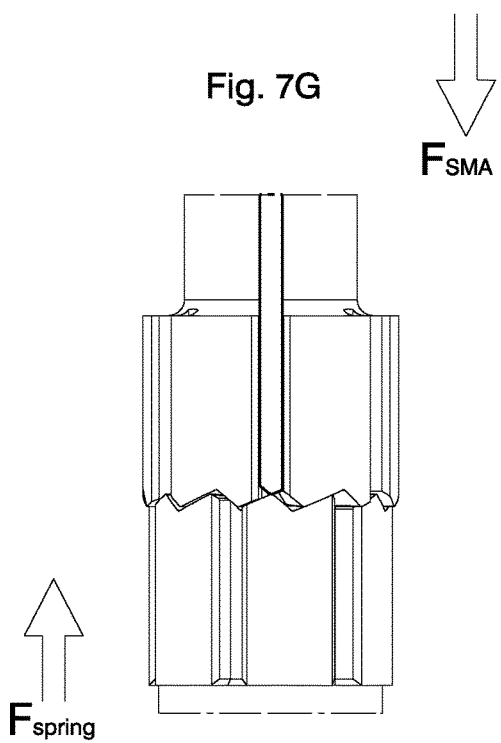
Figure 7H:
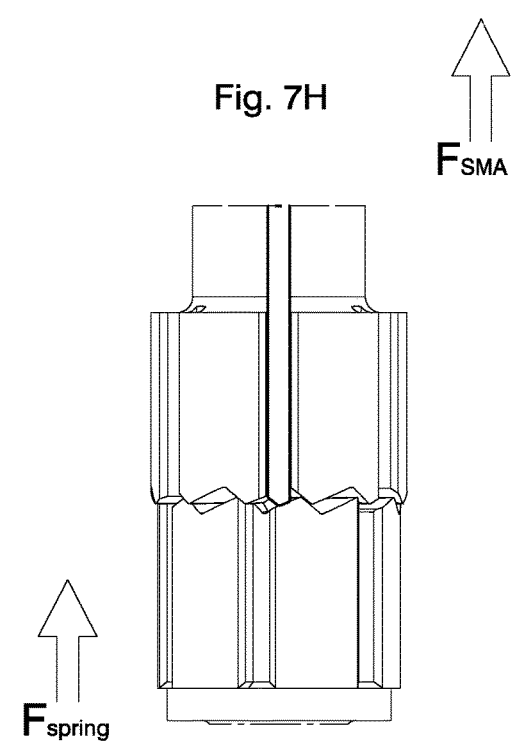

The operation of the bistable mechanism will now be described referring to FIGS. 7A to 7H. When the keys 82 of the frame cap 42 are engaged in the grooves 67 of the rotor 65, while no traction is applied by the SMA rods to the mobile mechanical interface 14 and the pusher tube 20, the pressure of the helical compression spring 56 urges the slider shaft 51 axially until the trailing flanks of the teeth of the rotor 65 eventually come to rest on the flanks of the teeth of the pusher tube 20. In this position (FIG. 7A), the bistable mechanism is in its stable state that corresponds to the retracted position of the slider shaft 51. Should the SMA rods now be heated to above the transition temperature, the change of shape will cause the pusher tube 20 to move axially forward. As the rotor is resting on the flanks of the teeth of the pusher tube, the rotor 65 and the slider shaft 51 will be urged axially forwards, against the action of the helical compression spring 56 (FIG. 7B). The forward movement of the rotor 65 eventually causes the grooves 67 to disengage completely from the keys 82. In this position (FIG. 7C), the bistable mechanism is in a transitory state that corresponds to the maximum stroke position of the slider shaft 51. The rotor is then free to rotate, and the inclined flanks of the teeth of the rotor can slide against the trailing flanks of the teeth of the pusher tube 20 while the rotor pivots until the two opposing sets of teeth are in a completely nested position. At this point (FIG. 7D), the angular position of the rotor 65 is such that the keys 82 are facing the top portions of the trailing flanks of its teeth. Should the heating means for the SMA rods now be turned off, the rods will gradually cool down and be reset to their predetermined deformation state by the reset spring 38. The new change of shape will cause the pusher tube 20 to move axially backwards. As the pusher tube retracts, the pressure of the helical compression spring 56 urges the rotor in the same direction. However, the grooves 67 are no longer in line with the keys 82 and the rotor therefore comes to rest against the frame cap 42 with the trailing flanks of its teeth bearing against the keys 82. As the rotor is still free to rotate, the trailing flanks of the teeth of the rotor can slide against the keys of the frame cap while the rotor pivots once more, until the keys rest at the bottom of the flanks. In this position (FIG. 7E), the bistable mechanism is in its stable state that corresponds to the extended position of the slider shaft 51. Should the SMA rods now be heated again to above the transition temperature, the change of shape will cause the pusher tube 20 to move axially forwards once more, and the flanks of the teeth of the pusher tube eventually come to rest on the trailing flanks of the teeth of the rotor 65 (FIG. 7F). From there on, the trailing flanks of the teeth of the rotor can slide against the inclined flanks of the teeth of the pusher tube 20 while the rotor pivots until the two opposing sets of teeth are in a completely nested position again (FIG. 7G). Should the heating means for the SMA rods now be turned off, the rods will gradually cool down causing the pusher tube 20 to move axially backwards. As the pusher tube retracts, the pressure of the helical compression spring 56 urges the rotor in the same direction. However, the grooves 67 are not yet in line with the keys 82 and the rotor is held back with the trailing flanks of its teeth bearing against the keys 82 (FIG. 7H). As the rotor is still free to rotate, the trailing flanks of the teeth can slide against the keys of the frame cap while the rotor pivots once more, until the keys 82 are again in line with the grooves 67 of the rotor (FIG. 7A).

It will be understood that various alterations and/or improvements evident to those skilled in the art could be made to the embodiments that forms the subject of this description without departing from the scope of the present invention defined by the annexed claims.

Annex:

Derivation of the Mathematical Expression

The circular helix formed by the coiled heating wire can be described mathematically by the following parametrization in Cartesian coordinates:

$$t \to (a \cos t, a \sin t, bt)$$

where a is the radius of the circular helix and b/a is its uniform slope.

The height of one complete helix turn (i.e. the "pitch" of the helix) is equal to $2\pi b$ and the "arc length" of the same complete turn is equal to $2\pi\sqrt{a^2+b^2}$.

The inventors were inspired to try to find a uniform oblique angle for a helix, or equivalently a uniform slope for a helix, such that the transverse and axial strains cancel out in such a way that the arc length of the helix after deformation of the strand of SMM is equal to the arc length of the helix before the deformation.

If ε is the elongation strain of the SMM strand, we can write:

$$L_{final} = L_{initial}(1+\varepsilon) \quad \text{(i)}$$

where L is the length of the SMM strand;
and if V is the volume of the SMM strand, we can write:

$$V_{initial} = L_{initial} \cdot 2\pi r_{initial} \quad \text{(ii)}$$

and if δ is the volume change ratio ($\delta = V_{final}/V_{initial}$), we can also write:

$$V_{final} = V_{initial} \cdot \delta = L_{initial} \cdot (1+\varepsilon) \cdot 2\pi r_{final}^2 \quad \text{(iii)}.$$

Now combining (ii) and (iii) leads to:

$$r_{final}^2 = \frac{\delta}{1+\varepsilon} \cdot r_{initial}^2 \quad \text{(iv)}$$

If the radius of the circular helix increases and decreases along with the radius of the SMM strand, (iv) implies that:

$$a_{final}^2 = \frac{\delta}{1+\varepsilon} \cdot a_{initial}^2 \quad \text{(v)}$$

and if the pitch of the circular helix increases and decreases along with the length L of the SMM strand, (i) implies that:

$$b_{final}^2 = (1+\varepsilon)^2 \cdot b_{initial}^2 \quad \text{(vi)}$$

Now, if the arc length of the circular helix remains constant, $$2\pi \cdot \sqrt{a_{initial}^2 + b_{initial}^2} = 2\pi \cdot \sqrt{a_{final}^2 + b_{final}^2} \quad \text{(vii)}$$

which implies that:

$$a_{initial}^2 + b_{initial}^2 = a_{final}^2 + b_{final}^2 \quad \text{(viii)}$$

Combining (viii) with (v) and (vi), we can further write:

$$a_{initial}^2 + b_{initial}^2 = \frac{\delta}{1+\varepsilon} \cdot a_{initial}^2 + (1 + 2\varepsilon + \varepsilon^2) \cdot b_{initial}^2 \quad \text{(ix)}$$

Finally, (ix) reduces to:

$$b/a = \sqrt[2]{\frac{\varepsilon + 1 - \delta}{\varepsilon(\varepsilon+1)(\varepsilon+2)}}$$

where b/a is the uniform slope of the circular helix

The invention claimed is:

1. An actuator (100) comprising:
a SMM strand (10a, 10b, 10c, 10d, 10e, 10f) made of shape memory material (SMM) and having a length that is variable between a first length corresponding to a contracted state of the SMM strand and a second length corresponding to an extended state of the SMM strand,
one of the contracted and extended states being an undeformed state and the other one thereof involving a predetermined lengthwise deformation of the SMM strand from the undeformed state,
wherein the SMM strand is arranged to return to the undeformed state from the state involving a predetermined lengthwise deformation when the SMM strand is heated to a predetermined temperature,
the SMM strand comprising a fixed end attached to a fixed mechanical interface (12) of a support structure, and a moving end attached to a mobile mechanical interface (14) movable between first and second positions in such a way that the mobile interface may move from one of the first and second positions to the other thereof when the variable length of the SMM strand changes from one of the first and second lengths to the other thereof, and
a resistive electrical heating means (16a, 16b, 16c, 16d, 24a, 24b, 26) comprising at least one coiled heating wire (16a, 16b, 16c, 16d) coiled around the SMM strand and in thermal and mechanical contact with the SMM strand, wherein heat is generated within the at least one coiled heating wire (16a, 16b, 16c, 16d) by electric current passing through the at least one coiled heating wire (16a, 16b, 16c, 16d);
wherein the at least one coiled heating wire (16a, 16b, 16c, 16d) forms a circular helix, the pitch of which is arranged to increase along with the length of the SMM strand when the length of the SMM strand changes from the first length to the second length, and arranged to decrease along with the length of the SMM strand when the length of the SMM strand changes from the second length to the first length, and wherein the uniform slope of the circular helix is selected so as to avoid any substantial change of the arc length of the circular helix caused by the SMM strand (10a, 10b, 10c, 10d, 10e, 10f) extending from the first length to the second length or contracting from the second length to the first length, and
wherein the heat generated within the at least one coiled heating wire (16a, 16b, 16c, 16d) flows into the SMM strand to heat the SMM strand above the predetermined temperature.

2. The actuator according to claim 1, wherein the uniform slope of the circular helix is selected so that any change of the arc length of the circular helix caused by the SMM strand (10a, 10b, 10c, 10d, 10e, 10f) extending from the first length to the second length, or contracting from the second length to the first length, amounts to no more than 0.2%.

3. The actuator according to claim 1, wherein, when the length of the SMM strand (10a, 10b, 10c, 10d, 10e, 10f) is the first length, the magnitude of the uniform slope b/a of the circular helix is comprised in the following interval:

$$b/a = \sqrt[2]{\frac{\varepsilon + 1 - \delta}{\varepsilon(\varepsilon+1)(\varepsilon+2)}} \pm 0.07$$

where: $2\% \leq \varepsilon \leq 4\%$ and $(\delta < \varepsilon + 1)$.

4. The actuator according to claim 1, wherein, when the length of the SMM strand (10a, 10b, 10c, 10d, 10e, 10f) is the first length, the magnitude of the uniform slope b/a of the circular helix is comprised in the following interval:

$$b/a = \sqrt[2]{\frac{\varepsilon + 1 - \delta}{\varepsilon(\varepsilon+1)(\varepsilon+2)}} \pm 0.05$$

where: $5\% \leq \varepsilon \leq 7\%$ and $(\delta < \varepsilon + 1)$.

5. The actuator according to claim 1, wherein, when the length of the SMM strand (10a, 10b, 10c, 10d, 10e, 10f) is the first length, the magnitude of the uniform slope b/a of the circular helix is comprised in the following interval:

$$b/a = 2\sqrt{\frac{\epsilon + 1 - \delta}{\epsilon(\epsilon + 1)(\epsilon + 2)}} \pm 0.03$$

where: $8\% \leq \epsilon \leq 10\%$ and $(\delta < \epsilon + 1)$.

6. The actuator according to claim 1, wherein the uniform slope of the circular helix is between 0.62 and 0.76 when the length of the SMM strand (10a, 10b, 10c, 10d, 10e, 10f) is the first length.

7. An actuator (100) comprising:
a SMM strand (10a, 10b, 10c, 10d, 10e, 10f) made of shape memory material (SMM) and having a length that is variable between a first length corresponding to a contracted state of the SMM strand and a second length corresponding to an extended state of the SMM strand,
one of the contracted and extended states being an undeformed state and the other one thereof involving a predetermined lengthwise deformation of the SMM strand from the undeformed state,
wherein the SMM strand is arranged to return to the undeformed state from the state involving a predetermined lengthwise deformation when the SMM strand is heated to a predetermined temperature,
the SMM strand comprising a fixed end attached to a fixed mechanical interface (12) of a support structure, and a moving end attached to a mobile mechanical interface (14) movable between first and second positions in such a way that the mobile interface may move from one of the first and second positions to the other thereof when the variable length of the SMM strand changes from one of the first and second lengths to the other thereof, and
an electrical means (16a, 16b, 16c, 16d, 24a, 24b, 26) comprising at least one coiled heating wire (16a, 16b, 16c, 16d) coiled around the SMM strand, wherein heat is generated within the at least one coiled heating wire (16a, 16b, 16c, 16d) by electric current passing through the at least one coiled heating wire (16a, 16b, 16c, 16d),
wherein the at least one coiled heating wire (16a, 16b, 16c, 16d) forms a circular helix, the pitch of which is arranged to increase along with the length of the SMM strand when the length of the SMM strand changes from the first length to the second length, and arranged to decrease along with the length of the SMM strand when the length of the SMM strand changes from the second length to the first length, and wherein the uniform slope of the circular helix is selected so as to avoid any substantial change of the arc length of the circular helix caused by the SMM strand (10a, 10b, 10c, 10d, 10e, 10f) extending from the first length to the second length or contracting from the second length to the first length, and
wherein the SMM strand (10a, 10b, 10c, 10d, 10e, 10f) is made from an electricity-conducting shape memory metal alloy (SMA), wherein a first end (24b) of the heating wire (16a, 16b, 16c, 16d) is electrically connected to the SMM strand near the moving end, the fixed end of the SMM strand being connected to one of the poles of a power supply, and wherein the second end (24a) of the heating wire is connected to the other pole of the power supply.

8. An actuator (100) comprising:
a SMM strand (10a, 10b, 10c, 10d, 10e, 10f) made of shape memory material (SMM) and having a length that is variable between a first length corresponding to a contracted state of the SMM strand and a second length corresponding to an extended state of the SMM strand,
one of the contracted and extended states being an undeformed state and the other one thereof involving a predetermined lengthwise deformation of the SMM strand from the undeformed state,
wherein the SMM strand is arranged to return to the undeformed state from the state involving a predetermined lengthwise deformation when the SMM strand is heated to a predetermined temperature,
the SMM strand comprising a fixed end attached to a fixed mechanical interface (12) of a support structure, and a moving end attached to a mobile mechanical interface (14) movable between first and second positions in such a way that the mobile interface may move from one of the first and second positions to the other thereof when the variable length of the SMM strand changes from one of the first and second lengths to the other thereof, and
an electrical means (16a, 16b, 16c, 16d, 24a, 24b, 26) comprising at least one coiled heating wire (16a, 16b, 16c, 16d) coiled around the SMM strand, wherein heat is generated within the at least one coiled heating wire (16a, 16b, 16c, 16d) by electric current passing through the at least one coiled heating wire (16a, 16b, 16c, 16d),
wherein the at least one coiled heating wire (16a, 16b, 16c, 16d) forms a circular helix, the pitch of which is arranged to increase along with the length of the SMM strand when the length of the SMM strand changes from the first length to the second length, and arranged to decrease along with the length of the SMM strand when the length of the SMM strand changes from the second length to the first length, and wherein the uniform slope of the circular helix is selected so as to avoid any substantial change of the arc length of the circular helix caused by the SMM strand (10a, 10b, 10c, 10d, 10e, 10f) extending from the first length to the second length or contracting from the second length to the first length, and
wherein the electrical heating means (16a, 16b, 16c, 16d, 24a, 24b, 26) comprise a plurality of the at least one coiled heating wire (16a, 16b, 16c, 16d) connected in parallel and forming a set of congruent circular helices having the same axis.

9. The actuator according to claim 1, further comprising a plurality of the SMM strand (10a, 10b, 10c, 10d, 10e, 10f) arranged in parallel, each SMM strand comprising a fixed end attached to the fixed mechanical interface (12) and a moving end attached to the mobile mechanical interface (14).

10. The actuator according to claim 1, further comprising a bistable mechanism arranged so as to convert back and forth movements of the mobile mechanical interface (14) between the first and second positions into displacements of a mechanical output interface (140) in one direction or the other between two distinct stable positions.

11. The actuator according to claim 1, wherein the resistive electrical heating means (16a, 16b, 16c, 16d, 24a, 24b, 26) for heating the SMM strand (10a, 10b, 10c, 10d, 10e, 10f) comprise a switch (142) arranged in such a way as to turn off the resistive electrical heating means once the SMM strand has returned to the undeformed state from the state involving a predetermined lengthwise deformation.

12. The actuator according to claim 1, further comprising a mechanical stopper (152) against which a bumper element of the mobile mechanical interface (14) is arranged to abut when the SMM strand has reached its predetermined lengthwise deformation from the undeformed state.

13. The actuator according to claim 1, wherein a first piece of thermally insulating material (28a) is intercalated between the fixed end of the SMM strand (10) and the fixed mechanical interface (12), and a second piece of thermally insulating material (28b) is intercalated between the moving end and the mobile mechanical interface (14).

14. The actuator according to claim 1, wherein the SMM is Cu—Al—Ni.

15. The actuator according to claim 14, wherein the SMM strand is made of a single crystal of Cu—Al—Ni.

16. The actuator according to claim 1, wherein the SMM strand is Ni—Ti.

17. The actuator according to claim 1, wherein the heating wire is made of Ni—Cr.

18. The actuator according to claim 2, wherein, when the length of the SMM strand (10a, 10b, 10c, 10d, 10e, 10f) is the first length, the magnitude of the uniform slope b/a of the circular helix is comprised in the following interval:

$$b/a = \sqrt[2]{\frac{\epsilon + 1 - \delta}{\epsilon(\epsilon + 1)(\epsilon + 2)}} \pm 0.07$$

where: $2\% \leq \epsilon \leq 4\%$ and $(\delta < \epsilon + 1)$.

19. The actuator according to claim 2, wherein, when the length of the SMM strand (10a, 10b, 10c, 10d, 10e, 10f) is the first length, the magnitude of the uniform slope b/a of the circular helix is comprised in the following interval:

$$b/a = \sqrt[2]{\frac{\epsilon + 1 - \delta}{\epsilon(\epsilon + 1)(\epsilon + 2)}} \pm 0.05$$

where: $5\% \leq \epsilon \leq 7\%$ and $(\delta < \epsilon + 1)$.

20. The actuator according to claim 2, wherein, when the length of the SMM strand (10a, 10b, 10c, 10d, 10e, 10f) is the first length, the magnitude of the uniform slope b/a of the circular helix is comprised in the following interval:

$$b/a = \sqrt[2]{\frac{\epsilon + 1 - \delta}{\epsilon(\epsilon + 1)(\epsilon + 2)}} \pm 0.03$$

where: $8\% \leq \epsilon \leq 10\%$ and $(\delta < \epsilon + 1)$.

* * * * *